April 30, 1935.  W. OWEN  1,999,594
APPARATUS FOR CUTTING GLASS
Filed May 29, 1934  4 Sheets-Sheet 3
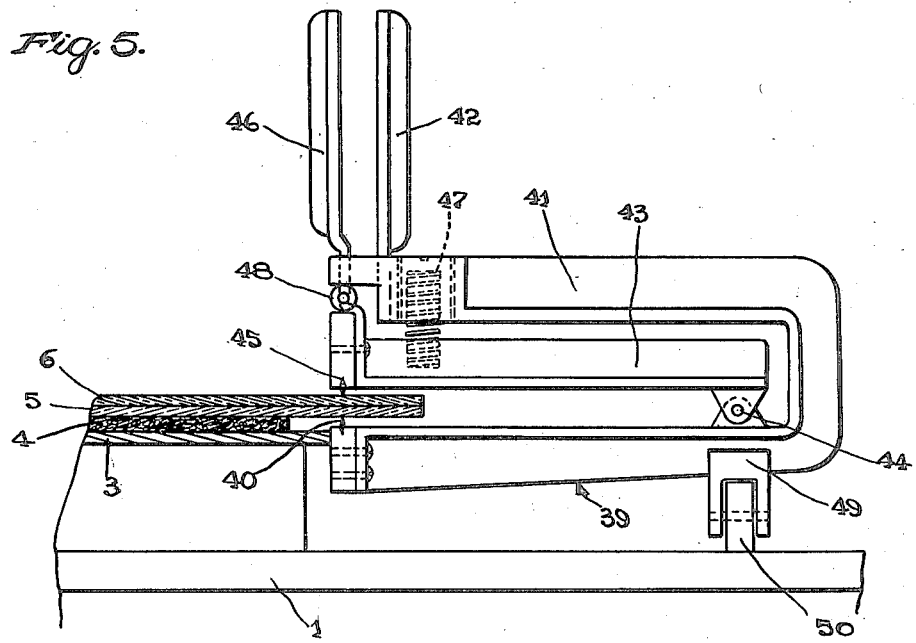
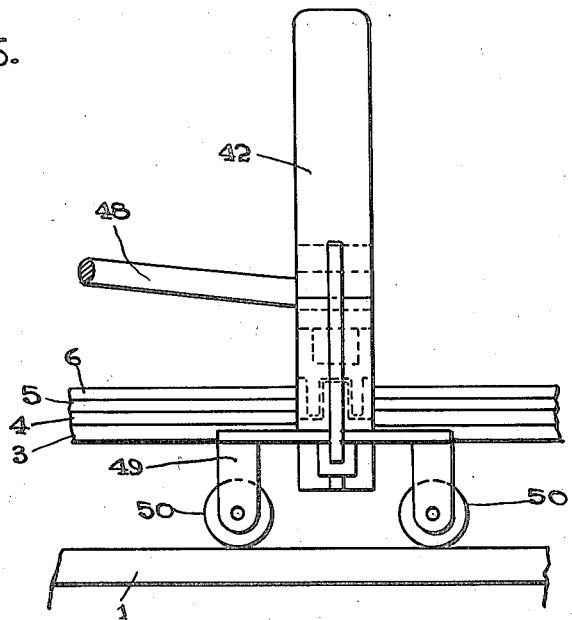
INVENTOR
WILLIAM OWEN
BY
ATTORNEYS

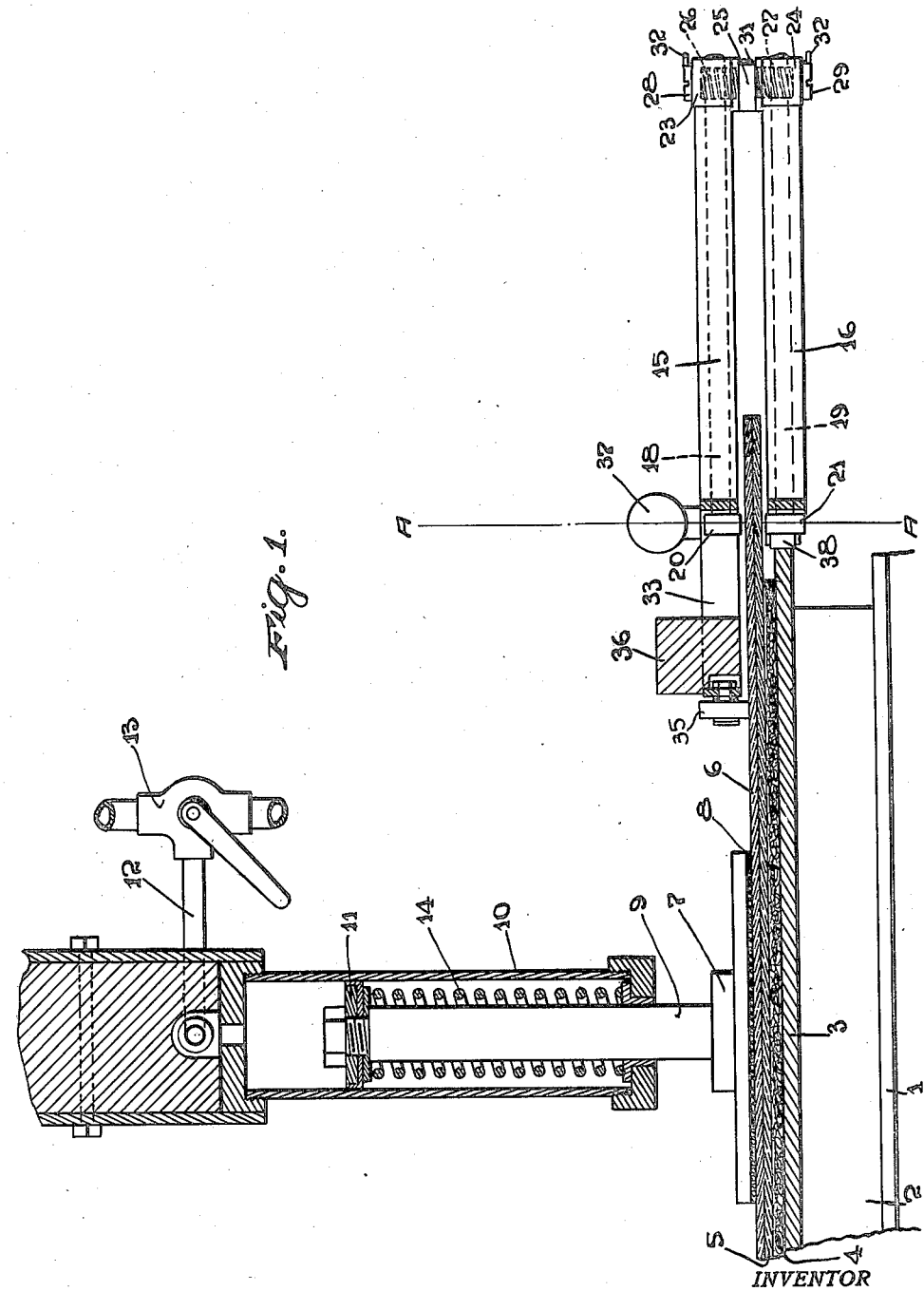

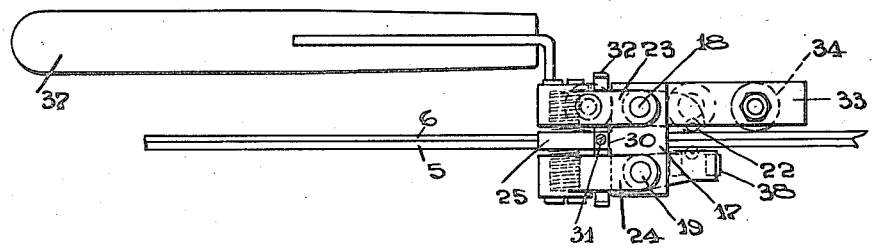
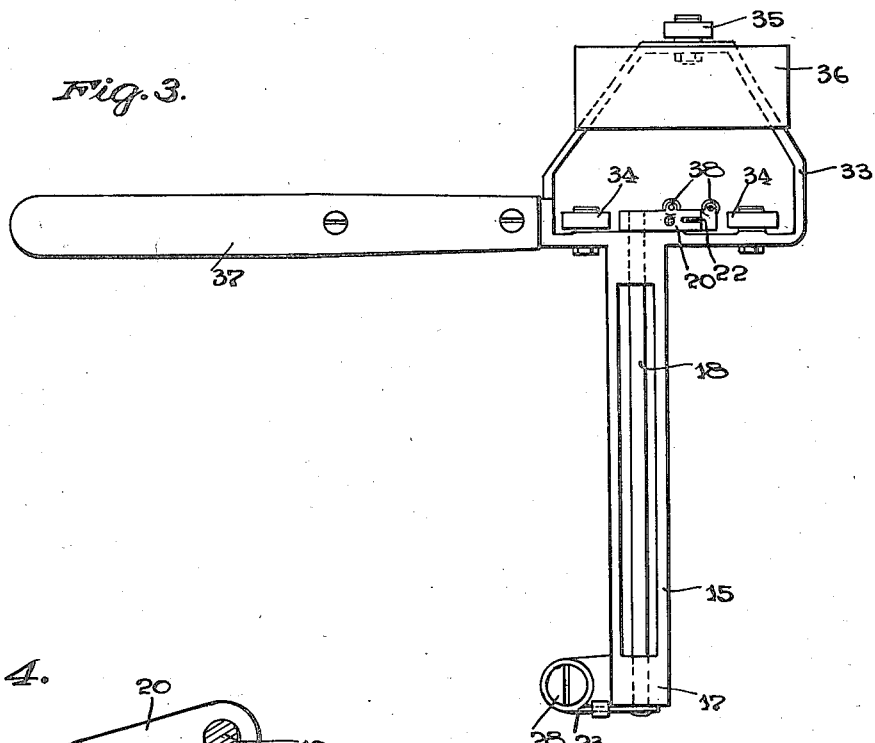
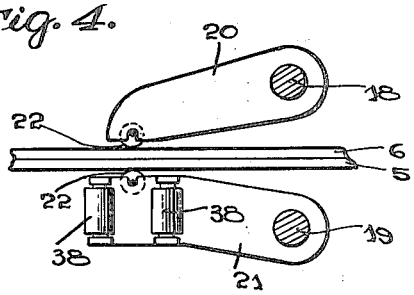

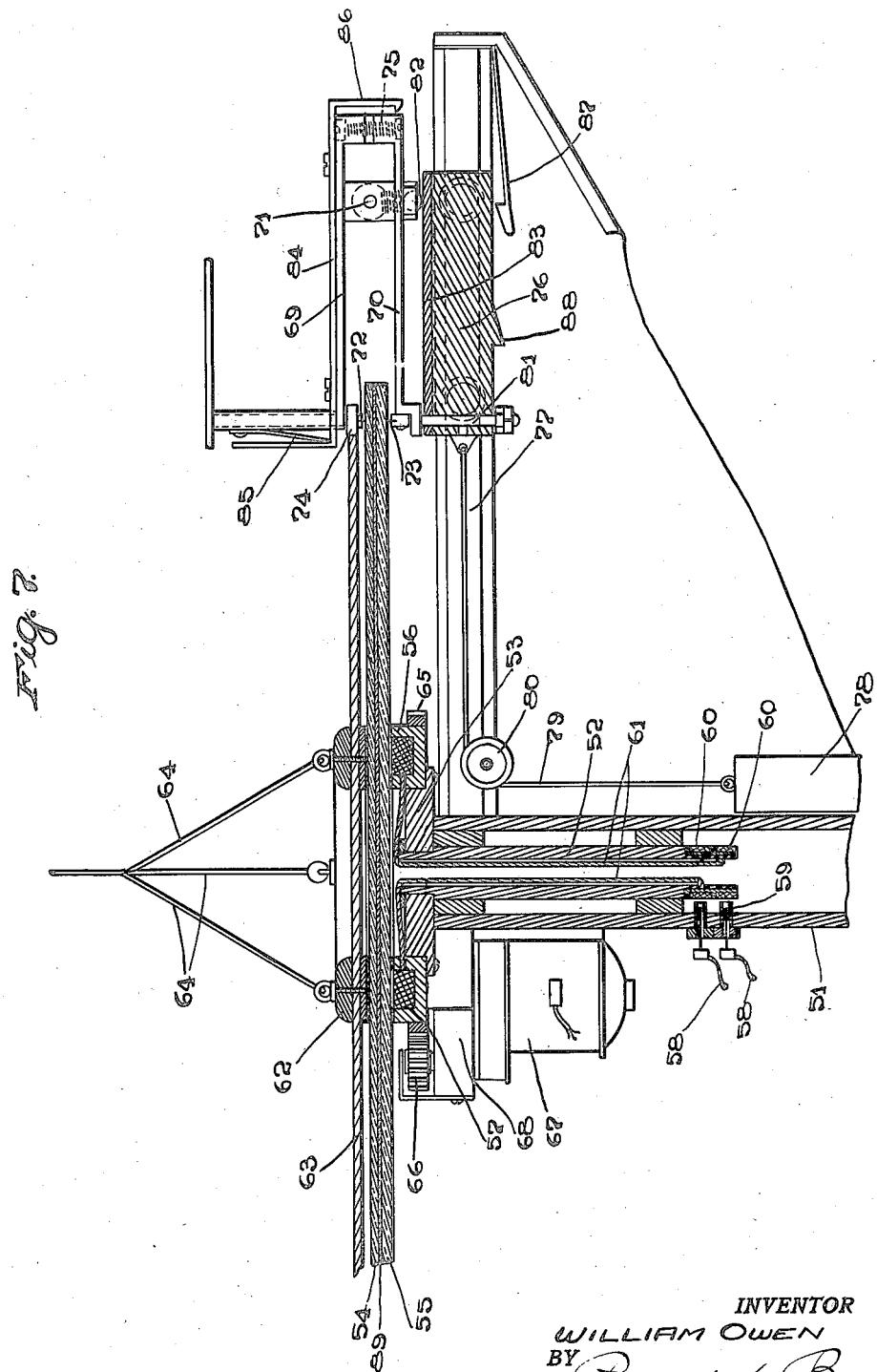

Patented Apr. 30, 1935

1,999,594

UNITED STATES PATENT OFFICE 1,999,594

APPARATUS FOR CUTTING GLASS

William Owen, Pittsburgh, Pa., assignor to Pittsburgh Plate Glass Company, a corporation of Pennsylvania Application May 29, 1934, Serial No. 728,099

12 Claims. (Cl. 33—42)

The invention relates to an apparatus for simultaneously cutting two glass sheets to the same contour, so that they will match perfectly when used on the opposite sides of a sheet of reinforcing material in the manufacture of safety glass. The application constitutes in part a division of my application, Serial No. 695,308, filed October 26, 1933. Heretofore the glass sheets have been individually cut, and while this is carefully done, using a templet as a guide for the scoring tool, the sheets never match exactly. The failure of the glass sheets to match with exactness calls for more edging work than would otherwise be the case, and the labor incident to cutting the sheets individually is nearly twice that involved when two sheets are cut at one operation. The object of the present invention is to provide an apparatus which will permit two sheets to be cut so that they will match perfectly and with substantially the same ease and absence from breakage as that involved in cutting single sheets. A further object of the invention is the provision of an apparatus which may be used to advantage in cutting two sheets of glass after they have been embodied in a plate of safety glass. Two forms of apparatus are shown in the accompanying drawings, wherein:

Figure 1 is a partial section and partial side elevation of the complete apparatus. Fig. 2 is an end elevation of a part of the apparatus of Fig. 1. Fig. 3 is a plan view of the apparatus shown in Fig. 2. Fig. 4 is a detail side elevation view of the cutter arms. Figs. 5 and 6 are views showing a modification, Fig. 5 being a side elevation, Fig. 6 an end elevation. And Fig. 7 is a section through another modification.

Referring to the construction shown in Figs. 1, 2 and 3, 1 is a table of wood or other suitable material on which is mounted a spacer 2 carrying a templet 3 of the exact contour to which the glass sheets are to be cut, and having its edge projecting out past the spacer. Upon the templet is a sheet 4 of yielding material, such as felt, which carries the two glass sheets 5 and 6 which are to be cut to exactly the same size and contour. The glass sheets are clamped down firmly upon the felt sheet 4 by the head 7 faced with the felt sheet 8 and carried by the piston rod 9. This piston rod works in an air cylinder 10 and is provided at its rear end with a suitable piston 11. The piston is forced down by the application of air supplied through the connection 12 which leads to a suitable source of air supply, a three-way valve 13 being employed in the line to control the flow of air to the upper end of the cylinder and its exhaust therefrom. The spring 14 serves to move the head 7 upward and releases the glass sheets after the cutting operation has been completed and the valve 13 has been moved to exhaust position.

The tool for forming the double cutting operation includes a frame consisting of the bars 15 and 16 secured together at their rear ends by the block 17, these parts preferably being in the form of a casting to give a rigid structure. Mounted for rotation in the bars 15 and 16 are a pair of shafts 18 and 19. These shafts carry at their forward ends a pair of arms 20 and 21, upon which the scoring wheels 22, 22 are mounted, and at their other ends carry another pair of arms 23 and 24 lying upon opposite sides of the tongue 25, which tongue constitutes a part of the block 17. The springs 26 and 27, which tension the cutters, are mounted in recesses in the ends of the arms 23 and 24 and have their inner ends in engagement with the tongue 25. The tension of these springs may be individually adjusted by means of the screw plugs 28 and 29. In order to limit the movement of the arms 23 and 24 away from each other, a bar 30 is secured to the tongue 25 by means of the screw 31 and has its ends turned out, as indicated at 32, 32 so as to lie above and below the arms. This prevents the arms 20 and 21 from approaching each other so that the cutters 22 strike each other.

Integral with the upper bar 15 and extending over the glass sheets 5 and 6 is a triangular frame member 33, by means of which the frame is guided during the cutting operation upon the upper face of the upper glass sheet. In order to accomplish this guiding function, the frame 33 is provided with three spaced wheels 34, 34 and 35. The wheels 34, 34 lie on opposite sides of the scoring wheels in alignment therewith, while the wheel 35 lies inward of the scoring wheels. In order to balance the device, a counterweight 36 is preferably secured upon the inner end of the frame 33. The guide means, including the three wheels serves to hold the frame in a horizontal position so that the vertical center line A—A, which passes through the scoring tools, always lies at right angles to the plane of the glass sheets. This arrangement insures a proper scoring action, such as would not be the case if the line A—A through the cutters were allowed to tilt so that it was not always at right angles to the plane of the glass sheets. Due to this proper maintenance of the cutting angle of the scoring members with respect to the surface of the glass, and to the tensioning effect of the springs 26 and 27, which can be accurately adjusted and maintained uniform, the operator is relieved from the exercise of any special skill, such as is ordinarily required in glass cutting, and an inexperienced cutter can work efficiently from the start and with very little loss from breakage.

In order to move the tool around the periphery of the templet 3, the frame is provided with a handle 37 which lies above the level of the scoring tools and in lateral alignment therewith. In order to reduce the friction between the lower arm 21 and the edge of the templet, such arm is preferably provided with a pair of small rollers 38, 38, which engage the edge of the templet. The handle works best if made of substantial length, and to secure good results, it should be attached to the tool at a point which lies approximately in the vertical plane in which the scoring members 22, 22 lie. It will be understood in this connection that, while scoring wheels are used, any other suitable scoring means known in the art, such as diamonds, may be employed.

In performing the severing operation with two sheets of glass, the operator moves the tool, positioned as indicated in Fig. 1, around the periphery of the templet, dragging it by the handle 37 and holding the wheel 35 in engagement with the upper surface of the glass sheet until the circuit of the templet is completed. If desired, as later more fully described, the table may be mounted for rotation so that it may be turned, permitting the operator to stand in one position, but preferably the table is fixed and the operator moves around it. After the cutting operation, the head 7 is released and the sheets 5 and 6 removed and another pair of sheets positioned for a second operation. The arms 20 and 21 of the tool are separated in order to apply such tool to the glass sheets by the operator grasping the ends of the arms 23 and 24 and squeezing them together, which action rotates the shafts 18 and 19 and separates the outer ends of the cutter arms 20 and 21. The stops 32, 32 prevent the cutter wheels from coming together and injuring each other when the operation is completed and the tool is removed from the glass.

Figs. 5 and 6 illustrate a modification in which the cutter frame is guided upon the table 1 instead of guiding such frame upon the glass as is done in the construction of Figs. 1 to 4. In this construction, the member 39, which carries the lower scoring wheel 40, is of U-shape and is provided upon its upper arm 41 with a handle 42. The other arm 43 of the device is pivoted to the member 39 at 44 and carries the cutting wheel 45. This arm is provided with a handle 46 in opposition to the handle 42 so that when the operator grips the two handles and presses the handle 46 toward the handle 42, the arm 43 is raised, thus separating the scoring wheels. A spring 47 between the arms 41 and 43 gives the desired yielding pressure of the scoring wheels upon the glass sheets. A laterally extending handle 48 secured to the arm 43 serves to drag the tool around the periphery of the glass sheets in accomplishing the scoring operation, such handle corresponding in function to the handle 37 of the construction of Figs. 1 to 4. In this instance, the cutting tool is guided so that the scoring tools are maintained in vertical alignment in a plane at right angles to the glass sheets by means of the member 49 provided with two wheels 50, 50 resting upon the upper surface of the table. While it is preferable to guide the tool upon the surface of the glass as is done by the three wheels 34, 34 and 35 of the Fig. 1 construction, such guiding can be satisfactorily done by the arrangement as shown in Figs. 5 and 6, the principle and method of operation being substantially the same.

Fig. 7 illustrates the arrangement heretofore referred to, wherein the cutting device is not moved around the periphery of the glass to accomplish the cutting operation, but instead the glass sheets are rotated, thus reducing the labor of the operator. This apparatus includes a fixed standard or pedestal 51, on which is mounted a sleeve 52 carrying at its upper end a support 53 for the glass sheets 54 and 55. This support includes an iron ring 56 carrying a winding 57 so that the ring 56 may be magnetized. Current is supplied to this winding from the leads 58, 58, connected at their ends to contact members 59 engaging the contact rings 60, 60, such rings being connected to the wires 61, 61 leading to the winding. In opposition to the ring 56 is another iron ring 62 made in two parts and clamping between the parts the templet 63. This ring is supported by connections 64 leading to a suitable raising and lowering device (not shown), which is located above the apparatus. The ring 56 is provided with a peripheral rack 65 engaged by a pinion 66, such pinion being rotated from a motor 67 through suitable reduction gearing in the casing 68. The apparatus, as just described, forms a convenient means for clamping the glass plates, holding them positioned with respect to the templet, and rotating the plates to carry them past the cutting tool.

The cutting tool comprises a pair of arms 69 and 70 pivoted together at 71 and provided at their forward ends with the scoring tools 72 and 73. A roller 74 on the upper arm 69 engages the edge of the templet 63. The ends of the arms carrying the cutters are pressed yieldingly towards each other by means of a spring 75 located between the rear ends of the arms. The cutting tool is mounted upon a carriage 76 slidably mounted in a guideway 77 secured to the standard 51. This carriage is yieldingly pulled inward by means of a counterweight 78 secured to the end of the carriage by a cable 79 passing over a pulley 80. The lower arm 70 of the cutting tool is pivotally connected to the carriage 76 by means of the rod 81, while the rear end of the arm 70 is provided with a ball 82, which rests upon a metal plate 83 carried upon the top of the carriage. This arrangement permits the operator to pivot the cutting tool about the rod 81, so that the scoring tools 72 and 73 shall lie at the proper angle for scoring as the glass sheets are rotated to carry their peripheries past the scoring tools. A slide member 84 is carried upon the upper side of the arm 69 and is normally pressed to the left by the leaf spring 85. This member 84 is provided at its end with a hook member 86 and when the device is not in use and the rear ends of the arms 69 and 70 are pressed toward each other, the lower end of the hook member engages beneath the end of the arm 70 and thus holds the forward ends of the arms 69 and 70 separated. This adds to the convenience in operating and protects the scoring tools against injury which might occur if they were allowed to strike each other. In order to hold the carriage 76 in retracted position to the right, the spring catch 87 is employed, such catch being adapted to engage the shoulder 88 when the carriage is moved to its extreme position to the right. The plates of glass may be clamped directly together as in the Fig. 1 construction, or may be separated by a sheet of yielding material 89, such as cloth, paper or other fabric.

What I claim is:

1. A cutting tool for simultaneously scoring two sheets of glass placed one above the other comprising a frame, a pair of arms pivoted on the frame for movement toward and from each other with their free ends provided with a pair of opposing scoring members, means for yieldingly pressing such free ends of the arms toward each other, and spaced guide means on the frame adapted to maintain the scoring members in a line at right angles to the plane of the glass sheets during the scoring operation.

2. A cutting tool for simultaneously scoring two sheets of glass placed one above the other comprising a frame, a pair of arms on the frame pivoted for movement toward and from each other with their free ends provided with a pair of opposing scoring members, means for yieldingly pressing such free ends of the arms toward each other, and spaced guide means on the frame adapted to engage the upper face of the upper glass sheet and maintain the scoring members in a line at right angles to the plane of the glass sheets during the scoring operation.

3. A cutting tool for simultaneously scoring two sheets of glass placed one above the other comprising a frame, a pair of arms on the frame pivoted for movement toward and from each other with their free ends provided with a pair of opposing scoring members, means for yieldingly pressing such free ends of the arms toward each other, and spaced guide means on the frame adapted to engage the upper face of the upper glass sheet and maintain the scoring members in a line at right angles to the plane of the glass sheets during the scoring operation, said guide means comprising a pair of wheels on opposite sides of the scoring members and a third wheel inward of such members.

4. A cutting tool for simultaneously scoring two sheets of glass placed one above the other comprising a frame, a pair of arms on the frame pivoted for movement toward and from each other with their free ends provided with a pair of opposing scoring members, means for yieldingly pressing such free ends of the arms toward each other, and spaced guide means on the frame adapted to engage the upper face of the upper glass sheet and maintain the scoring members in a line at right angles to the plane of the glass sheets during the scoring operation, said guide means comprising a pair of wheels on opposite sides of the scoring members and a third wheel inward of such members with a counterweight on the frame adjacent the third wheel.

5. A cutting tool for simultaneously scoring two sheets of glass placed one above the other comprising a frame, a pair of arms pivoted on the frame for movement toward and from each other with their free ends provided with a pair of opposing scoring members, means for yieldingly pressing such free ends of the arms toward each other, and a plurality of spaced guide wheels on the frame above the scoring member for supporting the frame upon the upper face of the upper glass sheet.

6. A cutting tool for simultaneously scoring two sheets of glass placed one above the other comprising a frame, a pair of arms pivoted on the frame for movement toward and from each other with their free ends provided with a pair of opposing scoring members, means for yieldingly pressing such free ends of the arms toward each other, a drag handle projecting laterally with respect to the arms directly above the scoring members, and a plurality of guide wheels for supporting the frame upon the upper face of the upper glass sheet.

7. Apparatus for simultaneously cutting two glass sheets to the same contour comprising a table, a spacer on the table, a templet above the spacer, means for clamping the templet and the two sheets to be cut one above the other on the spacer, a cutting frame, a pair of arms on the frame provided with opposing tensioned scoring members movable toward and from each other but held against relative lateral movement, and guide means on the frame for supporting it so that said members lie in a vertical line at right angles to the plane of the glass sheets.

8. Apparatus for simultaneously cutting two glass sheets to the same contour comprising a table, a spacer on the table, a templet on the spacer, means for clamping the two sheets to be cut one above the other on the templet, a cutting frame, a pair of arms on the frame provided with opposing tensioned scoring members movable toward and from each other but held against relative lateral movement, and guide means on the frame for engaging the upper face of the upper glass sheet so that said members are held in a vertical line at right angles to the plane of the glass sheets.

9. Apparatus for simultaneously cutting two glass sheets to the same contour comprising a table, a spacer on the table, a templet on the spacer, means for clamping the two sheets to be cut one above the other on the templet, a cutting frame, a pair of arms on the frame provided with opposing tensioned scoring members movable toward and from each other but held against relative lateral movement, and a plurality of spaced guide wheels on the frame engaging the upper face of the upper glass sheet.

10. Apparatus for simultaneously cutting two glass sheets to the same contour comprising a table, a spacer on the table, a templet on the spacer, means for clamping the two sheets to be cut one above the other on the templet, a cutting frame, a pair of arms provided with opposing tensioned scoring members movable toward and from each other but held against relative lateral movement, a guide wheel on the frame inward of said members adapted to engage the upper face of the upper glass sheet, and a drag handle projecting laterally from the frame and lying directly above the scoring members.

11. Apparatus for simultaneously cutting two glass sheets to the same contour comprising a table, a spacer on the table, a templet on the spacer, means for clamping the two sheets to be cut one above the other on the templet, a cutting frame, a pair of arms on the frame provided with opposing tensioned scoring members movable toward and from each other but held against relative lateral movement, a drag handle projecting laterally from the frame and lying in substantially the same vertical plane as the scoring members, a pair of guide wheels on the frame on opposite sides of said members adapted to engage the upper face of the upper glass sheet, a third guide wheel on the frame inward of said members adapted to engage the upper face of the upper glass sheet, and a drag handle projecting laterally from the frame and lying directly above the scoring members.

12. Apparatus for simultaneously cutting two glass sheets to the same contour comprising a table, a spacer on the table, a templet on the spacer, means for clamping the two sheets to be cut one above the other on the templet, a cutting frame, a pair of arms on the frame provided with opposing tensioned scoring members movable toward and from each other but held against relative lateral movement and guide means on the frame outward of said members for engaging the top of the table so that the members are held in a vertical line at right angles to the plane of the glass sheets.

WILLIAM OWEN.